United States Patent
Michail et al.

(10) Patent No.: US 10,430,983 B2
(45) Date of Patent: Oct. 1, 2019

(54) VERTEX PIXEL BUFFER

(71) Applicant: Microsoft Technology Licensing, LLC, Redmond, WA (US)

(72) Inventors: Ashraf Ayman Michail, Kirkland, WA (US); Michael George Boulton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 15/614,310

(22) Filed: Jun. 5, 2017

(65) Prior Publication Data

US 2018/0350039 A1  Dec. 6, 2018

(51) Int. Cl.
*G06T 11/40* (2006.01)
*G06T 9/00* (2006.01)

(52) U.S. Cl.
CPC .............. *G06T 11/40* (2013.01); *G06T 9/00* (2013.01)

(58) Field of Classification Search
CPC ...... H04N 19/46; H04N 19/54; H04N 19/523; H04N 13/161; H04N 19/167; G06T 9/00; G06T 1/00; G06T 9/20; G06T 7/12; G06T 7/13; G06T 7/344; G06T 7/75; G06T 11/40; G06F 17/21
See application file for complete search history.

(56) References Cited

U.S. PATENT DOCUMENTS

| | | | |
|---|---|---|---|
| 4,371,872 A | 2/1983 | Rossman | |
| 5,859,645 A * | 1/1999 | Latham | G06T 11/203 345/611 |
| 6,018,353 A | 1/2000 | Deering et al. | |
| 6,072,500 A | 6/2000 | Foran et al. | |
| 6,377,274 B1 | 4/2002 | Steiner | |
| 6,429,877 B1 | 8/2002 | Stroyan | |
| 6,741,247 B1 | 5/2004 | Fenney | |
| 2002/0177481 A1 | 11/2002 | Kitsutaka | |
| 2003/0063812 A1 * | 4/2003 | Burke | G06T 9/20 382/242 |
| 2008/0310731 A1 * | 12/2008 | Stojancic | G06K 9/00711 382/195 |
| 2012/0162454 A1 * | 6/2012 | Park | H04N 5/145 348/208.6 |
| 2016/0232678 A1 * | 8/2016 | Kurz | G06F 17/30247 |
| 2017/0160077 A1 * | 6/2017 | Featherstone | G01B 11/24 |

OTHER PUBLICATIONS

McGuire, et al., "Hardware-Determined Feature Edges", In Proceedings of the 3rd international symposium on Non-photorealistic animation and rendering, Jun. 7, 2004, 10 pages.

Gerdelan, Anton, "Vertex Buffer Objects", http://antongerdelan.net/opengl/vertexbuffers.html, Retrieved on: Feb. 6, 2017, 14 pages.

* cited by examiner

*Primary Examiner* — Haixia Du
(74) *Attorney, Agent, or Firm* — Workman Nydegger (57) ABSTRACT

Encoding pixel information for pixels of an image. A method includes accessing information defining high-frequency image data correlated with pixels. The method further includes for each pixel, identifying if a vertex from the high-frequency image data is located in that pixel based on analysis of the high-frequency data correlated with the pixel. The method further includes, for one or more pixels in which a vertex is located, identifying the location of the vertex. The method further includes encoding the vertex location into image pixel data.

20 Claims, 8 Drawing Sheets

VERTEX PIXEL BUFFER

BACKGROUND

Background and Relevant Art

Computing systems can be used to render image and video content on screens and various other devices, such as printers or other devices. However, typical output devices have a limited resolution at which they can display images and video. While these resolutions have been steadily increasing, they are nonetheless finite with respect to the amount of pixels that can be displayed within a given area. Additionally, even though an output device may be able to output image or video data at some resolution, situations may exist where image and video output is output at a resolution lower than the maximum resolution capable of the output device.

The images and video that are sent to the output devices, such as screens, may be based on data that has a much higher resolution than the output device is capable of outputting. Indeed, in many situations, the data has an infinite resolution due to the nature of the data. For example, consider a case where the data defines a line using a mathematical line equation. An infinite number of points along the line could be identified mathematically. However, a finite resolution output device is incapable of displaying all of these points.

Typically, when acquiring image data for output to an output device, algorithms are performed to sample the image data. An example where this is problematic is in the rendering of images through the application of texture maps to a polygon mesh. An object shape may be approximated by a wireframe representation. Typically, a plurality of instances of a geometric shape, such as a triangle, are used to model the shape. For example, a number of triangles are coupled together and arranged to approximate the surface of the object.

A shader is typically used to apply a texture map to the surface of the wireframe. The texture map is typically a bitmap or other image that, when properly attached to the surface of the wireframe object, creates the desired surface appearance. The shaded image, viewed from a desired perspective, can then be submitted for sampling. Because a side of the wireframe does not always lie on the sample points, portions of the surface may be missed in the sampling process. This can include the edges of instances the geometric shape used to form the wireframe.

A pixel is an approximation of the various contents in the pixel, but a single point represents the entire pixel, In particular, the pixel will have RGB (red, green blue) values that attempt to approximate the agglomeration of all items in the pixel. This can result in pixilation and other digital image artifacts.

Typical computation with images, video, and rendered content works with buffers of color values that are inherently incapable of representing features such as edges. Traditional mitigation for this deficiency is adding more pixels per degree which increases compute costs, bandwidth costs, and storage costs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of encoding pixel information for pixels of an image. The method includes accessing information defining high-frequency image data correlated with pixels. The method further includes for each pixel, identifying if a vertex from the high-frequency image data is located in that pixel based on analysis of the high-frequency data correlated with the pixel. The method further includes, for one or more pixels in which a vertex is located, identifying the location of the vertex. The method further includes encoding the vertex location into image pixel data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments of the invention mitigate edge feature representation issues by making use of existing high-frequency data that describes the image, video frames, or rendered content. Instead of simply increasing the sample rate or adding pixels per degree, the features of the high-frequency data are exploited to identify vertices present in the data. A vertex as used herein may include one or more of a geometric vertex of a regular geometric shape, a selected point along a line, when a line of a geometric shape does not have a geometric vertex, a corner on an irregular object, or a minimization of a derivative of a mathematical function. Feature data, including these vertices, can be added on a per-pixel basis and can be used to represent subpixel features, allowing for improved resolution over previous systems with lower computation, bandwidth, and/or storage costs as compared to those previous systems. In one embodiment, a compact representation of the feature data for a pixel is stored in memory already allocated to the pixel data structure, but which is unused in the image rendering process. In such embodiments, little or no extra bandwidth or storage is necessary.

Further, some embodiments of the invention allow for an improved capability system. In particular, image quality can be increased by the addition of the feature data stored by the system. Further, previous systems that had this same quality, required increased sample rates or other memory-intensive approaches. Thus, some embodiments herein implement systems with improved transmission and processing of an image which requires less time to sample and/or process the image. Such systems may further be improved by requiring less storage for the image with the same image quality. Further, such a system could have less memory than previous system, while still being able to process the same quality of images. Thus, embodiments of the invention may implement improved systems both in terms of performance and image resolution.

Figure 1:
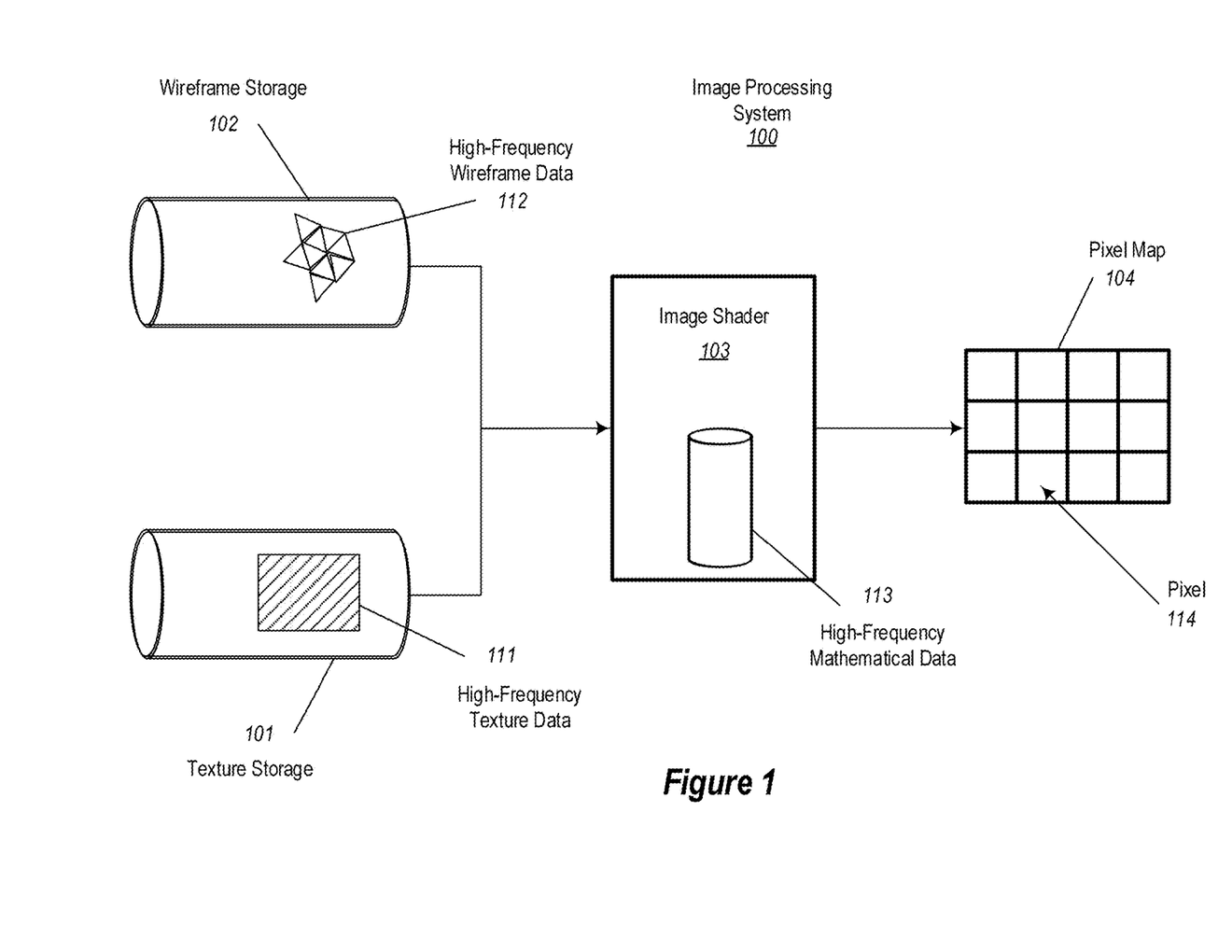
FIG. 1 illustrates an embodiment of an image processing system in which embodiments of the invention may be practiced.

Referring now to the figures, FIG. 1 is an embodiment of an image processing system 100. The image processing system 100 contains texture storage 101 for high-frequency texture data 111 and wireframe storage 102 for high-frequency wireframe data 112. These data are fed into an image shader 103, which maps the texture data 111 onto the wireframe data 112. For this process, the shader 103 generates additional high-frequency data in the form of high-frequency mathematical functions 113 that describes the mapping relationship of the texture data 111 and the wireframe data 112. More generally, the math specifies mapping of: zero or more textures; lighting information; procedural texture information; domain specific generations of data, etc. The output of the image shader 103 is an image made up of a pixel map 104. Each pixel, for example, pixel 114, contains data about the sampled contents of the image for that pixel. A pixel may correspond physically to geometric shapes from the wireframe storage 102, irregular shapes (or even regular shapes) from the texture storage 101, and mathematical artifacts resulting in high-frequency image data. In some embodiments, the image processing system may be (or at least include) a Graphics Processing Unit (GPU).

Figure 2:
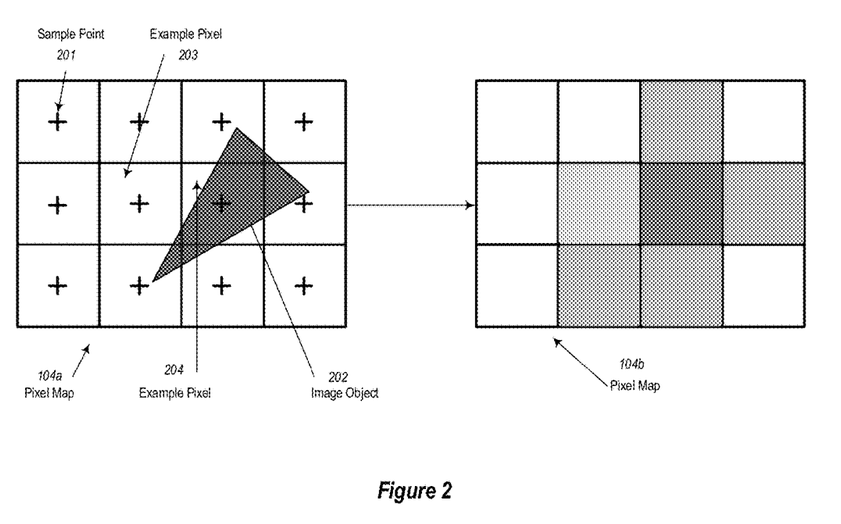
FIG. 2 illustrates image processing sampling.

FIG. 2 shows an example pixel map 104a with the sample points, for example, sample point 201, indicated and an image object 202 overlaid on the pixels. In example pixel 203, the sample point misses all of the image object 202, while in example pixel 204, a portion of the image object 202 is captured by the sample point. The resulting sampled pixel map 104b assigns color data to example pixel 204 based on the sample points. Note that, although not shown, getting the anti-aliased result shown in the pixel map 104b also requires more sample points than shown in the example (like MSAA sub-sample patterns). Note that the color value for the pixel may be based upon the sample point itself or some function applied across the area of the original image to combine the colors present in the pixel, which would result in color shading of pixels with less than all of the pixel corresponding to colored image objects. In any case, the resulting pixel map 104b will lack the resolution to properly represent the line detail of the image object 202. In some cases, this can be overcome by increasing the sample rate or the number of pixels per degree. This increases computation, bandwidth, and storage costs.

Figure 3:
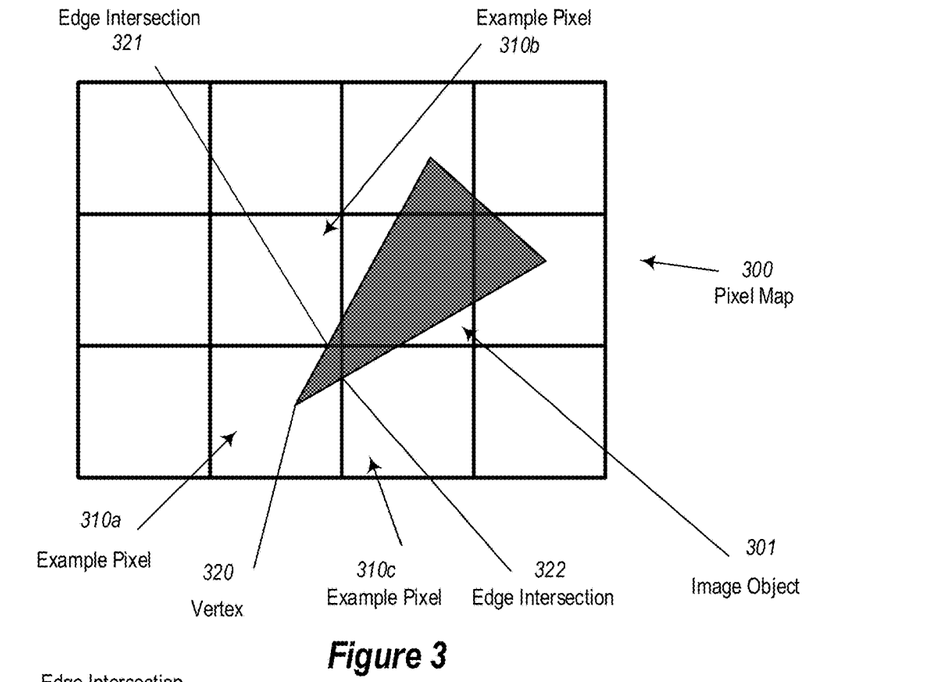
FIG. 3 illustrates feature information on high-frequency geometric data.

FIG. 3 shows pixel map 300 with an image object 301 overlaid on the pixels of the pixel map 300. In one embodiment, the image object 301 is high-frequency geometric data indicating a shape and its location on the pixel map 300. The geometric data allows for the identification of features of the geometric shape, including a vertex 320 (which in this case is a geometric vertex), the edge intersection 321 where the geometric shape crosses a boundary between pixels 310a and 310b, and the edge intersection 322 where the geometric shape crosses a boundary between pixels 310a and 310c.

Figure 4:
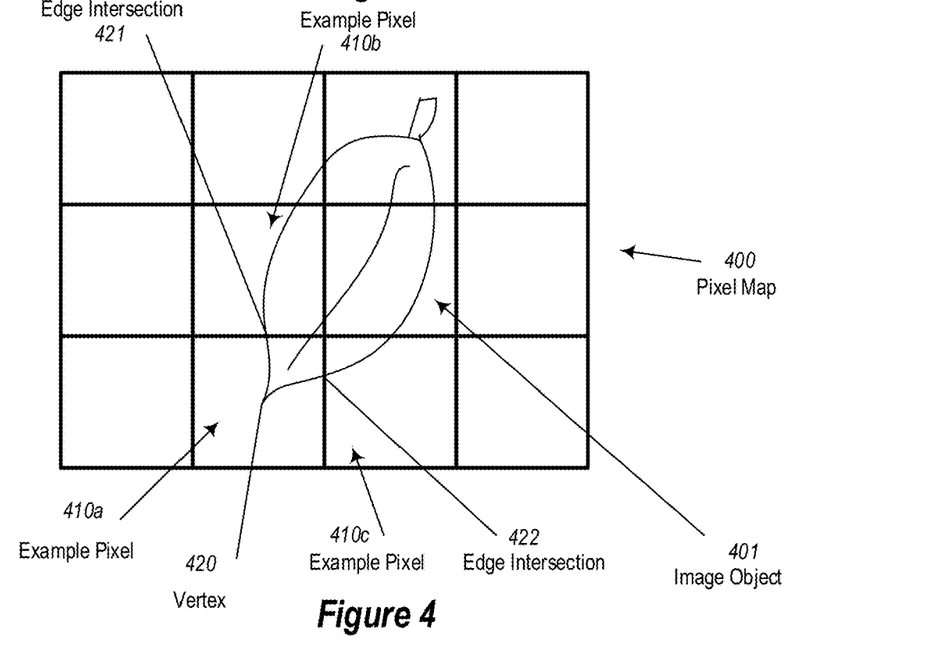
FIG. 4 illustrates feature information on high-frequency texture data.

FIG. 4 shows pixel map 400 with an irregular image object 401 overlaid on the pixels of the pixel map 400. In this embodiment, the image object 401 is high-frequency texture map data of an irregularly shaped (i.e., non-geometrically shaped) object 401 overlaid on the pixel map 400. The texture map data allows for the identification of features contained in the texture map image. In the example illustrated, the image object 401 is a leaf or vegetation. Features of the image object 401 include vertex 420 (which is a corner of the irregular object 401), an edge intersection 421 where the object in the texture map crosses a boundary between pixels 410a and 410b, and an edge intersection 422 where the object in the texture map crosses a boundary between pixels 410a and 410c.

Figure 5A:
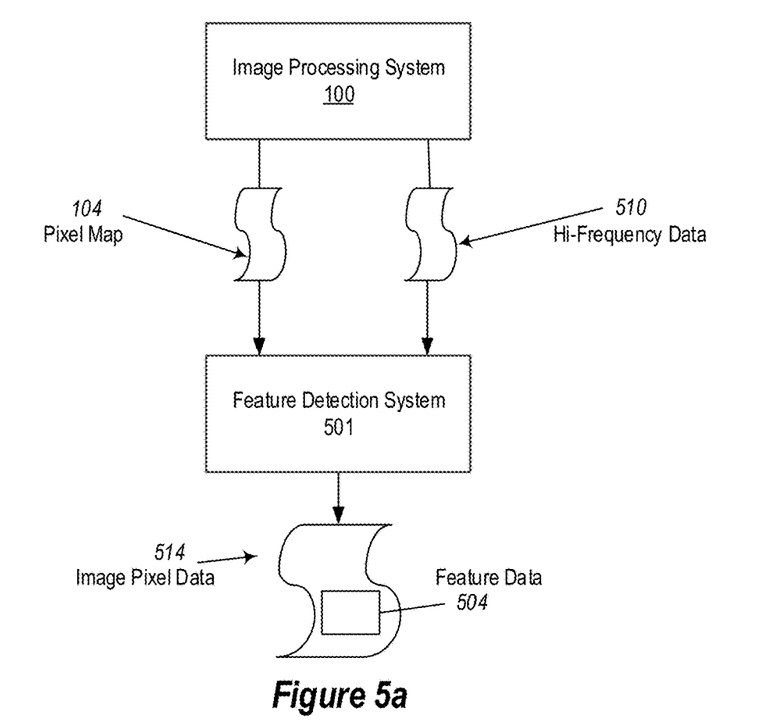
FIG. 5A illustrates an embodiment of an image processing system.

FIG. 5A shows an embodiment of the invention, where the image processing system 100 from FIG. 1 outputs the image pixel map 104. Additionally, high-frequency data 510 is output out of the image processing system 100. This high-frequency data 510 is correlated to pixel locations in the output pixel map 104 and contains information about mathematical processing on the image objects. The high-frequency data 510 and the pixel map 104 are passed into a feature detection system 501. Note that in some embodiments, the feature detection system 501 may be included in the image processing system 100.

This feature detection system 501 identifies features in the image objects, and potentially associated math, and correlates them with the pixel in which they are located. The feature detection system 501 outputs image pixel data 514 with associated feature data 504. The data 514 for each pixel will include the pixel color data (e.g., RGB data) and optionally feature data 504 corresponding to that pixel. The feature data 504 can represent sub-pixel features that are used to augment the existing sampled pixel map 104.

In particular, in some embodiments, feature data correlated to a given pixel will identify the location of a vertex such as a geometric vertex (e.g., for geometric shapes), a point on a line, a corner (e.g., for texture map objects) or a minimization of a derivative (e.g., for high-frequency math data). That is, in some embodiments, pixel data will include RGB data that define the pixel color along with the location of one of the features described above. In some embodiments, this can be accomplished by including an extra 8 bits of pixel data for each pixel to identify the sub-pixel location of the feature. Thus, for example, with reference once again to FIG. 3, the data for a pixel 310a may define the RGB data for the pixel 310a, which is an agglomeration of all of the color in the pixel 310a, along with the location of a vertex, which in this case is the geometric vertex 320 within the pixel 310a. With reference to FIG. 4, data for the pixel 410a may define the RGB data for the pixel 410a, which is an agglomeration of all of the color in the pixel 410*a*, along with the location of a vertex, which in this case is a corner represented by the vertex 420 within the pixel 410*a*. Note also, embodiments may generate data for a pixel that may include a vertex defined by a minimization of a derivative of a mathematical function.

While this example illustrates including an additional 8 bits of data, in some embodiments, as will be illustrated below, unused or under-used already existing bits may be used to store the vertex information.

In alternative or additional embodiments, feature data correlated to a given pixel will identify edge intersection information. In particular, in some embodiments, the edge intersection information identifies which edges (typically two) of a pixel are intersected by lines extending from the vertex, corner, or minimization of a derivative defined in the feature data correlated with a pixel. In some embodiments, an additional 4 to 6 bits of information can be included to identify which edge of a pixel a line of a feature, extending from a vertex, corner, or minimization of a derivative passes through. As noted, this can be done with 4-bits or 6-bits. For the 4-bits example, 2-bits specify up/down/left/right for incoming lines and 2-bits specify up/down/left/right for outgoing lines. For the 6-bit example, this is the same as 4-bit mode but adds one extra bit to for each of incoming and outgoing to be able to specify the diagonals. However, it should be appreciated that the diagonal indicators are rarely needed. Thus, for example, with reference once again to FIG. 3, the data for a pixel 310*a* may define the RGB data for the pixel 310*a*, which is an agglomeration of all of the color in the pixel 310*a*, along with the location of the vertex 320 within the pixel 310*a*, along with data indicating which edges edge intersections 321 and 322 occur with. With reference to FIG. 4, data for the pixel 410*a* may define the RGB data for the pixel 410*a*, which is an agglomeration of all of the color in the pixel 410*a*, along with the location of a vertex, which in this case is a corner represented by the vertex 420 within the pixel 410*a*, along with data indicating which edges edge intersections 421 and 422 occur with. Edge intersection information can be obtained from the math function where a gradient or Hessian matrix can be used to identify the intersections at the edges.

In alternative or additional embodiments, secondary color information may be included in, or associated with, feature data correlated to a given pixel. Such secondary color information may define a color occurring outside of an object. Thus, for example, with reference once again to FIG. 3, the data for a pixel 310*a* may define the RGB data for the pixel 310*a*, which is an agglomeration of all of the color in the pixel 310*a*, along with the location of the vertex 320 within the pixel 310*a*, along with data indicating which edges edge intersections 321 and 322 occur with, along with secondary color information defining the color of the object 301 and/or the color of the sub-pixel area outside of the object 301. With reference to FIG. 4, data for the pixel 410*a* may define the RGB data for the pixel 410*a*, which is an agglomeration of all of the color in the pixel 410*a*, along with the location of a vertex, which in this case is a corner represented by the vertex 420 within the pixel 410*a*, along with data indicating which edges edge intersections 421 and 422 occur with, along with secondary color information defining the color of the object 401 and/or the color of the sub-pixel area outside of the object 401. Secondary information would depend on the math function. For example, a math function could specify an analytic edge with one color on one side and another color on another side. Or, more typically, a high frequency specular term may be included such that the edge would be the color with specular versus the color without specular.

As noted above, in some embodiments, the data 514 includes feature data correlated with a given pixel which indicates the location of a vertex, such as a geometric vertex, point on a line, corner, and/or minimization of a derivative in the given pixel. There are a number of possible compact representations of the feature data. In some embodiments, feature data defining the location of a vertex is, at least partially, stored in the unused 8-bits in the XRGB buffers or the alpha channel in ARGB buffers. In particular, the unused 8-bits are particularly convenient for storing vertex location information. In some embodiments where only vertex location information is included, edge intersection information and secondary color can be inferred from local gradients of the image and adjacent pixels, including connectivity of vertices (when connecting portions of an object) in adjacent pixels.

In some embodiments, the data 514 includes feature data 504 which indicates the direction of edges connecting vertices in the image cross pixel boundaries. In particular, information is included defining which edges of a pixel lines extending from the vertex in the pixel intersect.

In some embodiments, the data 514 includes data in the feature data 504 which indicates connectivity between vertices in different pixels. In some embodiments, this information is stored in an additional 4 to 6-bits included in the pixel information for this purpose. In some embodiments with both vertex information and connectivity information, secondary color can be inferred from adjacent pixels.

In some embodiments, the data 514 includes data in the feature data 504 defining the primary and secondary colors found in a pixel. In some embodiments, information about the secondary color is stored in an additional 24-bits included in the pixel data 514 for this purpose.

For pixels with vertex information, the inclusion of feature data, in particular vertex location data, allows for an improvement in sampling steps included in texture sampling, projective transforms, distortion transforms, reprojection, or any image transform.

Figure 5B:
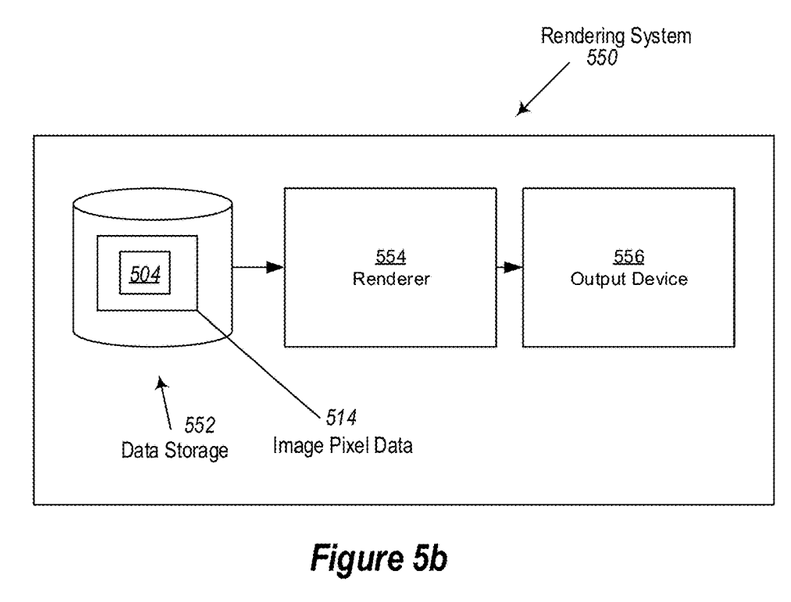
FIG. 5B illustrates an image rendering system.

Referring not to FIG. 5B, an image rendering system 550 is illustrated. The image rendering system is specially configured to receive image pixel data 514 that includes traditional pixel data for each pixel (such as RGB data), along with feature data 504 for pixels having defined sub-pixel features, such as vertex location data, edge intersection data, secondary color data, etc. In some embodiments, the image pixel data 514 may be stored in data storage 552. Typically, the image pixel data is stored on a per-pixel basis. That is, a discrete data element can be stored for each pixel which includes data for that particular pixel.

The rendering system 550 includes a renderer 554. The renderer is a computing entity configured to receive pixel data and to cause the pixel data to be used to render an image at an output device 556. The renderer 554 may include various components, such as processors configured to execute various actions for interpreting the image pixel data 514, hardware devices such as video cards, drivers, and/or other components configured to connect to output devices. The renderer 554 may include processors configured to consume feature data 504 such that the feature data can be used to reconstruct a more accurate image on an output device 556. In some embodiments, the rendering system 550 may be, or at least include, a GPU.

The output device may be, for example, a screen, a printer, a plotter, a 3D printing device, an automated CNC machine or other device.

Figure 6:
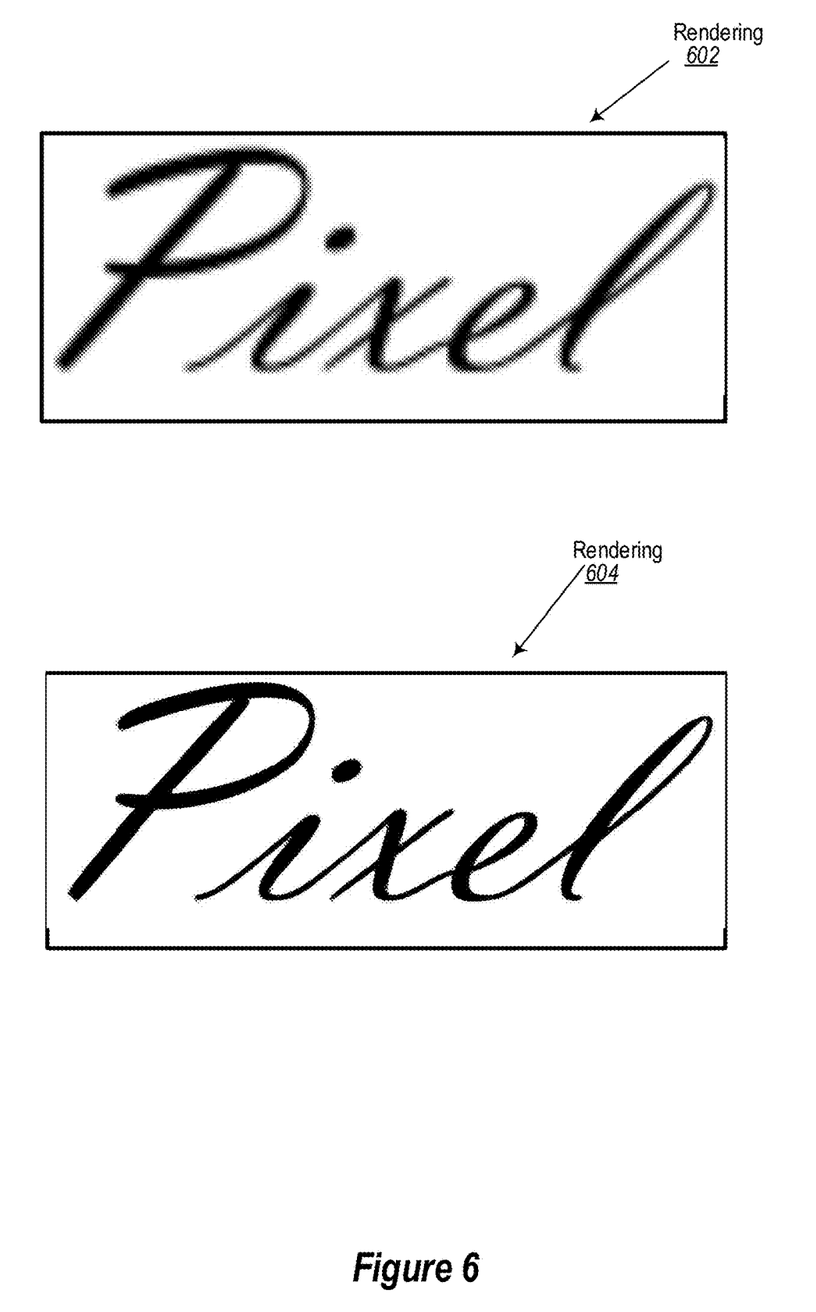
FIG. 6 illustrates a comparison of images with traditional pixels and those same images with pixels that have been encoded with sub-pixel information using an embodiment of the invention.

Referring now to FIG. 6, an example is illustrated where a rendering 602 of an image encoded using traditional pixel data (i.e., only color per pixel) is compared with a rendering 604 of the same image, encoded at the same resolution, but including additional pixel information including vertex, connectivity, and secondary color information. Dramatic improvement in the visual quality of high-frequency data is achieved with the additional data even though the number of pixels is the same between the renderings of the image.

Figure 7:
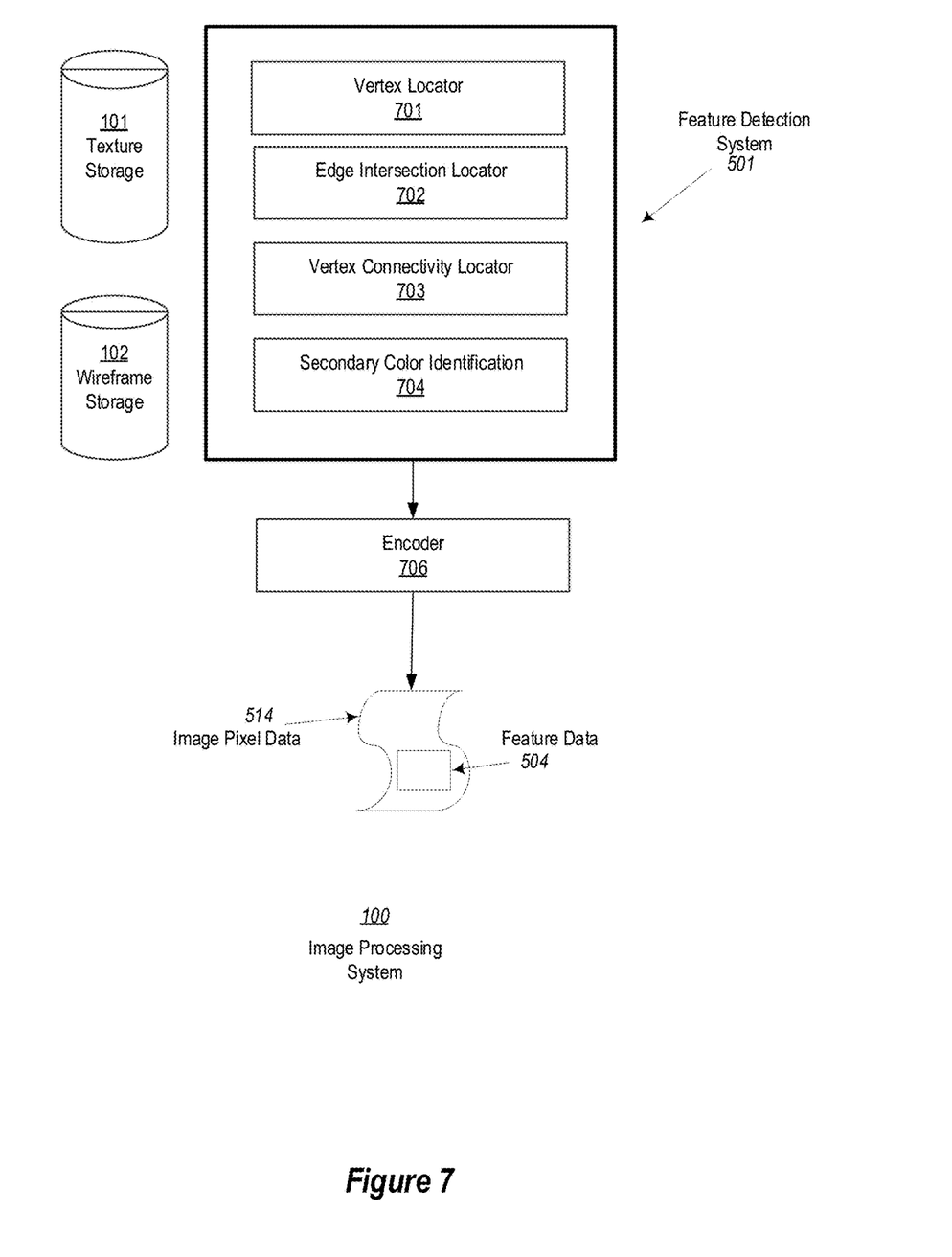
FIG. 7 illustrates an embodiment of the feature detection system.

FIG. 7 shows an embodiment of the feature detection system 501. The feature detection system includes a vertex locator 701 for finding the corner or vertex of image objects. The feature detection system 501 may also optionally include an edge-intersection locator 702 used to find where edges of objects, extending from a vertex, in the image cross pixel boundaries, a vertex-connectivity calculator 703 used to calculate the connections between vertices in different pixels, and a secondary color identifier 704 used to identify the secondary color in a pixel.

In some embodiments, the vertex locator 701 includes processors for using a corner-finding algorithm. Corner finding algorithms can be used to find corners of objects occurring in a pixel. Often they are used to find corners for irregular, non-geometric shapes. For example, corner finding algorithms are used to find corners of objects in a texture map corresponding to a pixel. For example, the corner-finding algorithm could be used to find vertex 420 in pixel 410a of FIG. 4.

In some embodiments, the vertex locator 701 includes processors for using a gradient descent algorithm optimized for a particular group of pixels. In some embodiments, the particular group of pixels are a group of pixels adjacent to a particular pixel. For example, in one embodiment, pixels 410a, 410b, and 410c in FIG. 4 might be a group of pixels. The vertex locator 701 could run the gradient descent algorithm to locate vertex 420 in pixel 410a of FIG. 4.

Figure 8:
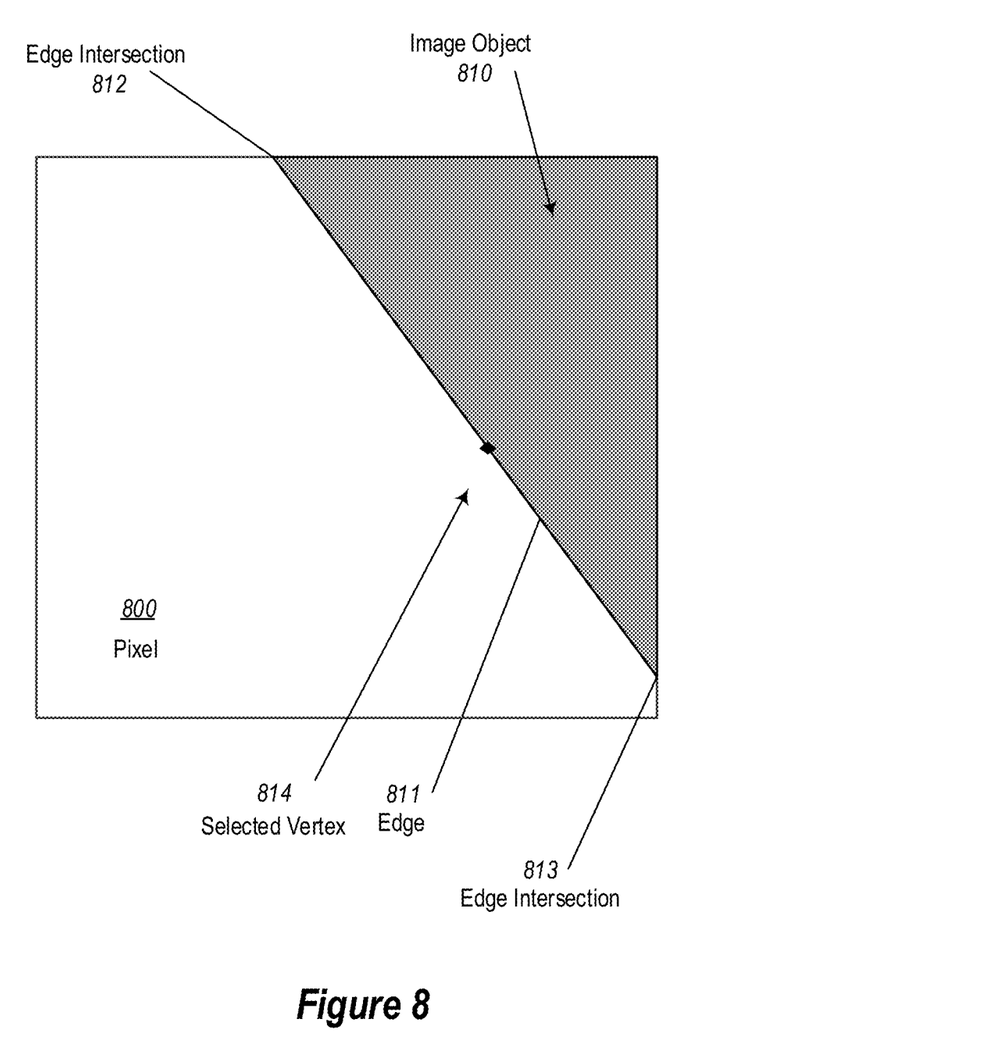
FIG. 8 illustrates feature data for an edge with no natural vertex and a vertex selected along the edge.

In some embodiments, the vertex locator 701 identifies a line between two edge intersections connected in the image and found by the edge-intersection locator 702. The vertex locator 701 then selects a point on the line as the vertex. For example, FIG. 8 shows pixel 800 containing high-frequency data 810. The high-frequency data 810 has edge intersection 812 and edge intersection 813, with the edge 811 being the line connecting them. In this example, the high-frequency data 813 in the pixel 800 does not contain a traditional corner or geometric vertex. Vertex locator 601 can select a point along the line, such as selected vertex 814, to act as the vertex for this pixel, with the edge 811 connecting the vertex to the edge intersections 812 and 813. In some embodiments, selected vertex 814 is selected midway between edge intersections 812 and 813.

In some embodiments, the vertex locator 601 includes processors for using a calculated or sampled minimization of a derivative to find vertex location from high-frequency data 510 in FIG. 5A that is mathematical functions 113 from the shader 103 in FIG. 1.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
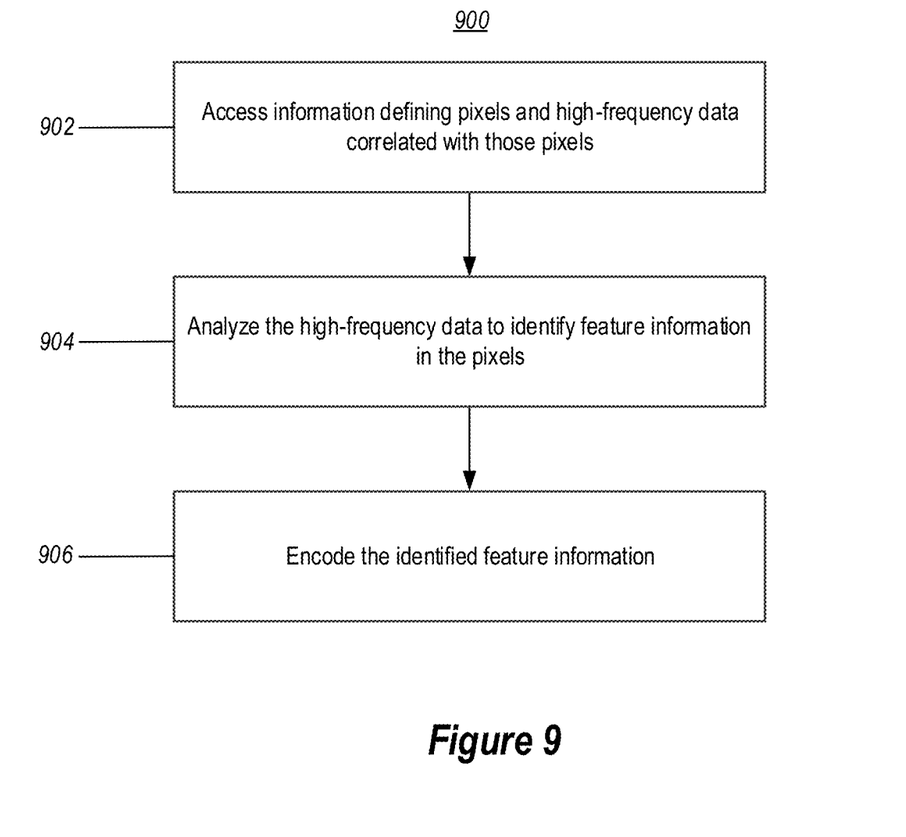
FIG. 9 illustrates a method of encoding pixel information.

FIG. 9 shows an embodiment of a method 900. The method 900 begins by accessing information defining pixels and high-frequency image data correlated with those pixels (Act 902). In some embodiments, the high-frequency data may be geometric data, texture map data, or mathematical data calculated by a shader.

Method 900 continues by analyzing the high-frequency data to identify feature data in pixels (Act 904). In some embodiments, feature data may be information about a vertex, edge intersection information, connectivity information between vertices, and/or secondary color information.

The identified feature data is encoded (Act 906). In some embodiments, encoding the identified feature data (Act 906) includes encoding the feature data into unused bits in the information defining the pixels.

The method 900 may include various acts for analyzing the high-frequency data to identify feature data. For example, the method 900 may identify one or more vertices and their locations in pixels.

In some embodiments, the vertex is a corner and is found using a corner-finding algorithm. For example, the corner-finding algorithm could be used to find vertex 420 in pixel 410a of FIG. 4.

In some embodiments, the vertex is found using a gradient descent algorithm optimized for a particular group of pixels. In some embodiments, the particular group of pixels are a group of pixels adjacent to a particular pixel. For example, in one embodiment, pixels 410a, 410b, and 410c in FIG. 4 might be a group of pixels. Act 902 could use a gradient descent algorithm to locate vertex 420 in pixel 410a of FIG. 4.

In some embodiments, The method 900 uses a calculated or sampled minimization of a derivative to find vertex location from, e.g., high-frequency data 510 in FIG. 5A that is mathematical functions 113 from the shader 103 in FIG. 1.

In some embodiments, the method 900 optionally includes identifying edge intersections between lines connecting vertices and pixel edges.

In some embodiments, the method 900 optionally includes identifying connectivity between vertices in different pixels.

In some embodiments, the method 900 optionally includes selecting a vertex on a line connecting edge intersections where the line and edge intersections are associated with a pixel containing no vertex on the line. For example, FIG. 8 shows pixel 800 containing high-frequency data 810. The high-frequency data 810 has edge intersection 812 and edge intersection 813, with the edge 811 being the line connecting them. In this example, the high-frequency data 813 in the pixel 800 does not contain a corner or geometric vertex. The method 900 could select a point along the line, such as selected vertex 814, to act as the vertex for this pixel, with the edge 811 connecting the vertex to the edge intersections 812 and 813. In some embodiments, selected vertex 814 is selected midway between edge intersections 812 and 813.

In some embodiments, the method 900 optionally includes identifying primary and secondary colors in pixels.

Further, the above methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs) etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An image processing system for encoding pixel data for pixels of an image, the image processing system comprising:
   a feature detection system, wherein the feature detection system is configured to access information defining high-frequency data corresponding to locations on a pixel map of the pixels and extract at least sub-pixel vertex locations from the high-frequency data for pixels; and
   an encoder coupled to the feature detection system configured to encode the sub-pixel vertex locations into pixel data for the pixels, such that the pixel data for the pixels includes, for each pixel, a discrete data element which includes color data and feature data, the feature data including a sub-pixel vertex location for the high frequency data for the pixel.

2. The image processing system of claim 1, wherein the feature detection system comprises a secondary color identifier that is further configured to extract secondary color information from the high-frequency data and correlate the secondary color information to the pixels, and wherein the encoder is further configured to encode the secondary color information into the discrete data element.

3. The image processing system of claim 1, wherein:
   the high-frequency data comprises geometric data; and
   wherein the feature detection system is configured to extract a location of a geometric vertex of a geometric shape in the geometric data.

4. The image processing system of claim 1, wherein:
   the high-frequency data comprises geometric data;
   wherein the feature detection system comprises an edge intersection locator that is configured to identify pixel edge intersections from a geometric shape in the geometric data.

5. The image processing system of claim 1, wherein the feature detection system comprises a vertex connectivity calculator configured to compute connectivity information defining connectivity between a sub-pixel vertex in a first pixel of the pixels and sub-pixel vertices in other pixels of the pixels that are adjacent to the first pixel, wherein the connectivity information approximates shape edges in the high-frequency data.

6. The image processing system of claim 1, wherein the high-frequency data comprises results of a shading function.

7. A computer system comprising:
one or more processors; and
one or more computer-readable media having stored thereon instructions that are executable by the one or more processors to configure the computer system to encode feature data into pixel definitions for an image, including instructions that are executable to configure the computer system to perform at least the following:
access information defining high-frequency data corresponding to locations on a pixel map of pixels;
identify feature data comprising sub-pixel vertex locations in the pixels from the high-frequency data for the pixels; and
encode the sub-pixel vertex locations into pixel data for the pixels, such that the pixel data for the pixels includes, for each pixel, a discrete data element which includes color data and feature data, the feature data including a sub-pixel vertex location for the high frequency data for the pixel.

8. The computer system of claim 7, wherein the one or more computer-readable media further have stored thereon instructions that are executable by the one or more processors to configure the computer system to identify the sub-pixel vertex locations using a corner-finding algorithm.

9. The computer system of claim 7, wherein the one or more computer-readable media further have stored thereon instructions that are executable by the one or more processors to configure the computer system to identify the sub-pixel vertex locations using a gradient descent algorithm that optimizes connectivity between a predetermined set of pixels from among the pixels.

10. The computer system of claim 9, wherein the predetermined set of pixels comprises pixels adjacent to a pixel where a sub-pixel vertex has been located.

11. The computer system of claim 7, wherein the one or more computer-readable media further have stored thereon instructions that are executable by the one or more processors to configure the computer system to identify the sub-pixel vertex locations using a calculated or sampled derivative of the high-frequency data.

12. A method of encoding pixel data for pixels of an image, the method comprising:
accessing information defining high-frequency data corresponding to locations on a pixel map of the pixels;
for each pixel, identifying if a sub-pixel vertex can be located in that pixel based on analysis of the high-frequency data corresponding to the pixel;
for one or more pixels in which a sub-pixel vertex can be located, identifying the location of the sub-pixel vertex; and
encoding in pixel data for the one or more pixels in which a sub-pixel vertex can be located, the sub-pixel vertex location such that pixel data for the pixels includes, for each pixel, a discrete data element which includes color data and feature data, the feature data including a sub-pixel vertex location for the high frequency data for the pixel.

13. The method as recited in claim 12, further comprising:
for the one or more pixels in which a sub-pixel vertex can be located, identifying secondary color information by identifying a dominant color and a secondary color; and
encoding secondary color information into the pixel data.

14. The method as recited in claim 12, wherein:
the high-frequency data for each pixel comprises geometric data; and
wherein identifying the location of the sub-pixel vertex comprises identifying a geometric vertex of a geometric shape located in the pixel.

15. The method as recited in claim 14, further comprising:
computing connectivity information defining connectivity between the sub-pixel vertex selected in the pixel and sub-pixel vertices in other pixels that are part of the geometric shape; and
encoding the connectivity information into the pixel data.

16. The method as recited in claim 12, wherein:
the high-frequency data comprises geometric data; and
wherein identifying the location of the sub-pixel vertex comprises identifying pixel edge intersections from a geometric shape in the geometric data and selecting a point along a line connecting the pixel edge intersections as the sub-pixel vertex.

17. The method as recited in claim 12, wherein:
the high-frequency data comprises texture data; and
wherein the sub-pixel vertex location for at least one of the pixels is identified from the texture data using a corner-finding algorithm.

18. The method as recited in claim 17, further comprising:
for the sub-pixel vertex location identified by the corner-finding algorithm, computing connectivity information defining connectivity between the sub-pixel vertex location and connected vertices located in other pixels; and
encoding the connectivity information into the pixel data.

19. The method as recited in claim 12, wherein
the high-frequency data comprises texture data;
wherein the sub-pixel vertex location is computed using a gradient descent algorithm; and
wherein the gradient descent algorithm optimizes connectivity between a predetermined set of pixels from among the pixels.

20. The method as recited in claim 12, wherein
the high-frequency data comprises results of executing a shading function; and
the sub-pixel vertex location is computed using a calculated or sampled minimization of a derivative of the high frequency data.

* * * * *